Patented Feb. 21, 1939

2,148,275

UNITED STATES PATENT OFFICE 2,148,275

MANUFACTURE OF SURFACE ACTIVE AGENTS

Kurt Nagel, Frankfort-on-the-Main, Germany, assignor to Deutsche Gold- und Silber-Scheideanstalt vormals Roessler, Frankfort-on-the-Main, Germany, a German company No Drawing. Application December 8, 1937, Serial No. 178,752. In Germany December 18, 1936

7 Claims. (Cl. 252—1)

The present invention relates to a new process of manufacture of substances which may be used in order to lessen the surface tension of liquids.

It is an object of this invention to produce a new substance, which may be used as a surface active agent such as a wetting agent, flotation agent or for producing foams, etc.

It is another object of the invention to manufacture these agents in a most simple and cheap manner.

According to my invention pitch is treated with caustic solutions, that is, with aqueous solutions or suspensions of alkaline substances, whereby aqueous extracts are obtained. These extracts are to be used as surface active agents.

As starting material pitches which remain as residue when tars (high or low temperature tars of coal, lignite, and peat) are distilled, may be used. I prefer a pitch which I obtain as residue when distilling wood tars. The pitches may be of different viscosity, such as hard pitch or advantageously softer pitch. There may also be used the pitches which are obtained by heating the tars with oxygen containing gases.

The treatment of the pitches, according to the invention, may be carried through with aqueous solutions of sodium hydroxide, potassium hydroxide, ammonia or amines. The mixing is done at usual or higher temperatures. An aqueous solution of barium hydroxide or calcium hydroxide can be used, too. This effect is quite surprising, as the known foam producing agents could not be applied together with hard, that is, calcium oxide containing water.

It is a special advantage of the new surface active agents that they are unaffected by lime oxide or magnesium oxide, so that with the manufacture of these agents lime containing water can be used. These foam producing substances, thus manufactured, are brownish coloured. It is possible to purify these agents by treating them with adsorptive agents.

Though the new products can be immediately used, it is possible to bring them into a concentrated or solid state by evaporating the water from the liquids. The substances may then be diluted or dissolved by water in order to be applied for the different purposes.

On the other hand the extracted liquids according to the invention may be acidified so that the active agents are precipitated and can be isolated by sedimenting or extracting them. These concentrates can be made ready for use by dissolving them in alkaline water.

The new products may be used for many purposes such as wetting agents, or for preparing emulsions, such as emulsions of bitumina in building roads. They are excellent foam agents for purposes of flotation of ores, etc. They are well adapted to manufacturing foam for fire extinguishing purposes, especially because they can be used in mixtures with hard water.

The invention may be carried out in the following manner:

Example 100 g. of a finely powdered rather hard pitch of beechwood tar were treated with the solution of 15 ccm. 10% sodium hydroxide in 300 ccm. water at ordinary temperature for 1 hour. The liquid was separated and the remaining pitch was treated with a similar quantity of new sodium hydroxide in the same manner, whereafter the extract obtained was again separated. This treatment was repeated once more. The different extracts were united and evaporated till a solid residue remained. In this way one obtained 12 g. of the surface active agent in a solid state. In order to make use of the pitch remaining from the extraction these residues were treated under the same conditions at 70°. This treatment was carried through five times and upon evaporating the 5 extracts, 25 g. of the surface active substance were obtained.

What I claim is:

1. The process for the manufacture of a highly concentrated foaming agent stable in the presence of soluble alkaline earth salts which comprises digesting wood tar pitch with weak aqueous alkaline solutions, separating the aqueous liquid from the residue, and concentrating it by evaporating.

2. The process for the manufacture of emulsifying, froth-forming and wetting agents stable in the presence of soluble alkaline earth salts which comprises reacting wood tar pitch with weak aqueous alkaline solutions to obtain an aqueous solution of pitch extractives, and isolating said pitch extractives whereby emulsifying, froth forming and wetting agents capable of forming permanent emulsions stable in the presence of alkali-earth compounds are produced.

3. The process for the manufacture of emulsifying, froth forming and wetting agents stable in the presence of soluble alkali earth salts which comprises reacting wood tar pitch with weak aqueous alkaline solutions to obtain an aqueous solution of pitch extractives, adding acid to said solution of pitch extractives until said pitch extractives are precipitated and separating said precipitated pitch extractives whereby emulsifying, froth forming and wetting agents capable of forming permanent emulsions stable in the presence of alkali-earth compounds are produced.

4. The process for the manufacture of emulsifying, froth forming and wetting agents stable in the presence of soluble alkali earth salts which comprises digesting wood tar pitch with weak aqueous alkaline solutions at a temperature of about normal atmospheric temperatures to about 70° C. until the extraction of said pitch is completed to obtain an aqueous solution of pitch extractives and a residue, separating said aqueous solution of pitch extractives from said residue and concentrating said pitch extractives whereby emulsifying, froth forming and wetting agents capable of forming permanent emulsions stable in the presence of alkali-earth compounds are produced.

5. The process for the manufacture of emulsifying, froth forming and wetting agents stable in the presence of soluble alkali earth salts which comprises digesting wood tar pitch with caustic soda in a ratio of about 100 parts of tar pitch residue to about 1.5 parts by weight of caustic soda in the presence of about 300 parts by weight of water at normal atmospheric temperatures for about one hour to obtain an aqueous solution of pitch extractives and a residue, digesting said residue in the presence of water with portions of fresh caustic soda at temperatures of about 0° C. to about 70° C. to obtain residues and additional aqueous solutions of pitch extractives until the extraction of said pitch residue is completed, separating the solution of pitch extractives from the residue each time before digesting with fresh caustic soda and water, combining all aqueous solutions of pitch extractives to form a composite solution of pitch extractives and evaporating said composite solution of pitch extractives until a solid is obtained whereby emulsifying, froth forming and wetting agents capable of forming permanent emulsions stable in the presence of alkali-earth compounds are produced.

6. The process for the manufacture of emulsifying, froth forming and wetting agents stable in the presence of soluble alkali earth salts which comprises digesting about 100 parts by weight of beechwood-tar pitch at the temperature of the surrounding air with about 300 parts by weight of an aqueous extracting solution containing about 16 to about 17 parts by weight of a 10% aqueous solution of caustic soda, continuing said digestion for about an hour to obtain an aqueous solution of pitch extractive and a residue, separating said aqueous solution of pitch extractives from said residue, digesting said residue with fresh extracting solution to obtain a second aqueous solution of tar extractive and a second residue, digesting said second residue with fresh aqueous extracting solution at a temperature of about 70° C. to obtain an aqueous solution of tar extractives and a third residue and repeating said digestion at 70° C. with fresh aqueous extracting solution as many times as is necessary to complete the extraction of said pitch and separating the solution of extractives from the residue each time, uniting all solutions of extractives to form a composite solution of pitch extractives, and evaporating said composite solution of pitch extractives until a solid residue is obtained whereby emulsifying, froth forming and wetting agents capable of forming permanent emulsions stable in the presence of alkali-earth compounds are produced.

7. The process for the manufacture of emulsifying, froth forming and wetting agents stable in the presence of soluble alkali earth salts which comprises digesting about 100 parts by weight of wood-tar pitch at the temperature of the surrounding air with about 1.5 parts by weight of caustic soda in the presence of about 300 parts by weight of water, continuing said digestion for about an hour to obtain an aqueous solution of pitch extractive and a residue, separating said aqueous solution of pitch extractives from said residue, digesting said residue with fresh extracting solution to obtain a second aqueous solution of tar extractive and a second residue, digesting said second residue with fresh aqueous extracting solution at a temperature of about 70° C. to obtain an aqueous solution of tar extractives and a third residue and repeating said digestion at 70° C. with fresh aqueous extracting solution as many times as is necessary to complete the extraction of said pitch and separating the solution of extractives from the residue each time, uniting all solutions of extractives to form a composite solution of pitch extractives, and evaporating said composite solution of pitch extractives until a solid residue is obtained whereby emulsifying, froth forming and wetting agents capable of forming permanent emulsions stable in the presence of alkali-earth compounds are produced.

KURT NAGEL.